United States Patent [19]

Brown

[11] 4,353,501
[45] Oct. 12, 1982

[54] FUSIBLE AQUATIC DEVICE THAT WILL OVERRIDE THE FAILURE OF A DEFECTIVE THERMOSTAT OR THE LIKE WITHIN A MOTOR

[76] Inventor: George Brown, 317 S. Harbor Dr., Venice, Fla. 33595

[21] Appl. No.: 245,181

[22] Filed: Mar. 18, 1981

Related U.S. Application Data

[63] Continuation-in-part of Ser. No. 94,079, Nov. 14, 1979, abandoned.

[51] Int. Cl.³ .............................................. F01P 7/02
[52] U.S. Cl. .................................. 236/34.5; 137/73; 137/74
[58] Field of Search ................... 236/34, 34.5; 137/73, 137/74, 72; 122/504.1, 504.3; 220/89 B

[56] References Cited

U.S. PATENT DOCUMENTS

| | | | |
|---|---|---|---|
| 1,740,421 | 12/1929 | Friedman | 137/73 X |
| 1,740,422 | 12/1929 | Snow | 137/73 X |
| 2,589,072 | 3/1952 | Garretson | 137/73 |
| 2,859,031 | 11/1958 | Hansen et al. | 137/73 X |
| 3,227,144 | 1/1966 | Sigl | 122/504.1 |
| 3,490,473 | 1/1970 | Ehrens et al. | 137/74 |
| 3,776,457 | 12/1973 | Cardi | 236/34.5 |
| 4,245,782 | 1/1981 | Brown | 236/34.5 |

Primary Examiner—William E. Tapolcai

[57] ABSTRACT

A thermostat for a liquid cooling system comprising a seat member having a flow opening therethrough, a closure member movable between an open position spaced from the seat member and a closed position in engagement with the seat member wherein it closes the flow opening, the closure member or the seat member having an aperture therethrough, a device for biasing the closure member to the closed position, a temperature responsive device for moving the closure member to an open position against the force of the biasing device, and a fusible plug in the closure member or seat member aperture that is adapted to melt at a predetermined temperature. In the event of failure of the temperature responsive device of the thermostat, the fusible plug will melt at the predetermined temperature and open the aperture in the closure member or the seat member to allow the flow of cooling liquid past the closure member when it is in the closed position.

5 Claims, 5 Drawing Figures

FUSIBLE AQUATIC DEVICE THAT WILL OVERRIDE THE FAILURE OF A DEFECTIVE THERMOSTAT OR THE LIKE WITHIN A MOTOR

CROSS REFERENCE TO RELATED APPLICATION

This application is a continuation-in-part of patent application Ser. No. 94,079, filed Nov. 14, 1979 now abandoned.

BACKGROUND OF THE INVENTION

Thermostats presently used for automobile engines or the like, although they generally serve their intended purpose, are subject to certain disadvantages. First of all, they do not control engine temperature within a sufficiently narrow range to insure efficient engine operation. Secondly, in the event of failure of the thermostat mechanism, the thermostat is closed to prevent the flow of cooling liquid which results in overheating of the engine.

A need has arisen, therefore, for a thermostat that closely controls engine temperature for fuel savings and permits an adequate flow of cooling liquid therethrough to prevent engine overheating in the event of failure of the operating mechanism of the thermostat.

SUMMARY OF THE INVENTION

The thermostat of the present invention is not subject to the above-described disadvantages of known thermostats. It comprises a seat member having a flow opening therethrough, a closure member movable between an open position spaced from the seat member and a closed position in engagement with the seat member wherein it closes the flow opening, the closure member or seat member having an aperture therethrough, a device for biasing the closure member to the closed position, a temperature responsive device for moving the closure member to an open position against the force of the biasing device, and a fusible plug in the closure member or seat member aperture that is adapted to melt at a predetermined temperature. In the event of failure of the temperature responsive device of the thermostat, the fusible plug will melt at the predetermined temperature and open the aperture in the closure member of the seat member to allow the flow of cooling liquid past the closure member when it is in the closed position.

The closure member or the seat member may be provided with a plurality of apertures therethrough having fusible plugs therein which are fusible at different predetermined temperatures to more closely control engine temperature.

DESCRIPTION OF THE PREFERRED EMBODIMENTS

Figure 1:
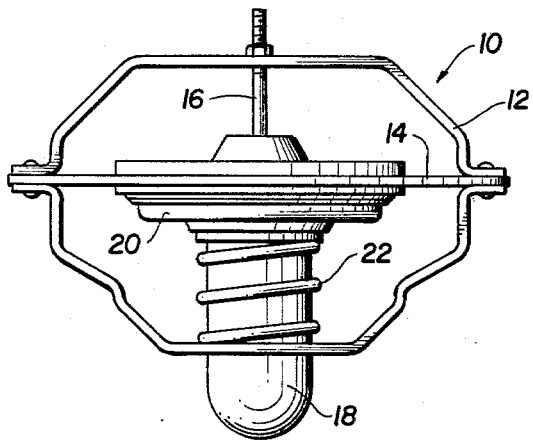
FIG. 1 is a side elevational view of the thermostat of the present invention.
Figure 2:
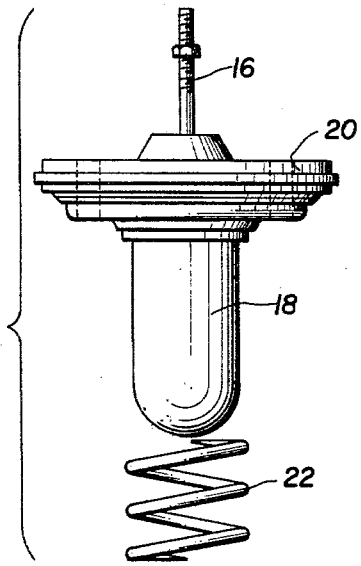
FIG. 2 is an exploded side elevational view of the closure member and the biasing spring of the thermostat shown in FIG. 1.

FIG. 1 illustrates a thermostat 10 for the liquid cooling system of an engine or the like, having a frame 12 with an annular valve seat member 14 having a flow opening (not shown) therethrough. Attached to the frame 12 is a stem 16 which extends through the flow opening formed by the valve seat 14.

The stem 16 has a portion thereof disposed within a container 18 which contains thermally responsive, expansible-contractable material (not shown). The stem 16 and container 18 may be of the type disclosed in U.S. Pat. Nos. 2,806,375 and 2,806,376, or may be of any other suitable type well known in the art. During expansion of the thermally responsive material within the container 18, there is relative movement between the stem 16 and the container 18 in a direction one away from the other.

A closure member 20 is secured to the container 18 for movement therewith. A helical spring 22 encompasses the container 18 and has one end portion in engagement with the closure member 20 and the other end portion in engagement with the frame 12. Accordingly, the spring 22 serves to urge the closure member 20 to a closed position in engagement with the valve seat 14 to close the flow opening therethrough, as shown in FIG. 1.

In the event of the inoperativeness of the actuating container 18 or the thermally responsive material therewithin, the spring 22 maintains the closure member 20 in the closed position against the valve seat 14, thereby preventing the flow of liquid past the thermostat 10. In such a case, the temperature of the cooling liquid in contact with the thermostat may become excessively high because of a lack of flow or circulation of the liquid through the cooling system of the engine or the like.

Figure 3:
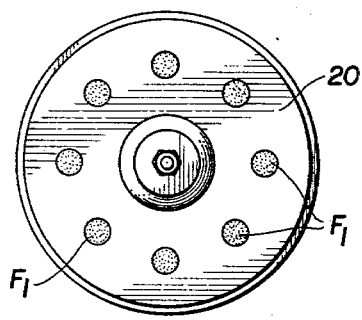
FIG. 3 is a top plan view of the closure member shown in FIG. 2, with fusible plugs in the apertures therethrough.
Figure 4:
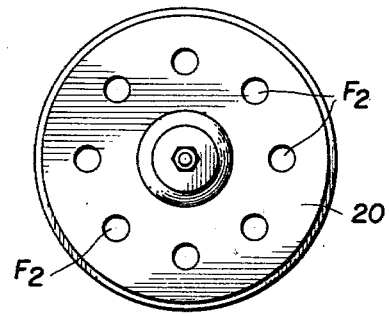
FIG. 4 is a view similar to FIG. 3 showing the fusible plugs removed from the apertures through the closure member.

A significant feature of the present invention is the provision of a thermostat which can closely control the temperature of the cooling liquid and which will allow for the flow of cooling liquid therethrough in the event of failure of the thermostat mechanism. This is accomplished by providing at least one aperture $F_2$ extending through the closure member 20, as shown in FIG. 4. The aperture $F_2$ is closed by a fusible plug $F_1$ (FIG. 3) which is adapted to melt at a predetermined temperature. In the event of failure of the thermostat mechanism, the temperature of the cooling liquid in contact with the thermostat will rise to the predetermined temperature to cause melting of the fusible plug $F_1$ to open the aperture $F_2$ and allow the flow of cooling liquid through the aperture and thus through the thermostat, thereby preventing overheating of the engine or the like in which the thermostat is utilized.

Figure 5:
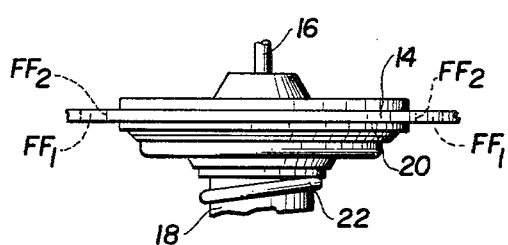
FIG. 5 is a partial, enlarged side elevational view of the thermostat shown in FIG. 1, with the apertures and fusible plugs therein located in the seat member rather than the closure member.

As shown in FIG. 5, at least one aperture $FF_2$ and fusible plug $FF_1$ may be provided in the valve seat 14 instead of the closure member 20, and will serve the same purpose as the aperture $F_2$ and fusible plug $F_1$ in the closure member 20, as hereinbefore described.

In accordance with the scope of the present invention, the closure member 20 or valve seat 14 may be provided with a plurality of apertures having fusible plugs therein, with the fusible plugs melting at the same or different predetermined temperatures. When the plugs are fusible at different predetermined temperatures, the temperature of the cooling liquid and the engine can be closely controlled to effect fuel savings.

In tests conducted by an independent agency on a 225 cubic inch, six cylinder automobile engine at 2000 rpm and at 2200 rpm, it has been found that fuel efficiency can drop significantly when the motor operating temperature differs from the peak efficiency temperature. For example, fuel consumption can drop in excess of 6% for a 5° Fahrenheit change from peak efficiency temperature.

The fusible plug or plugs $F_1$, $FF_1$, may be formed of any suitable material, such as a typical In, Bi, Sn formula or Cd, Bi, Pb formula.

What is claimed is:

1. A thermostat for a liquid cooling system, comprising:
    a seat member having a flow opening therethrough,
    a closure member movable between an open position spaced from said seat member and a closed position in engagement with said seat member wherein it closes said flow opening, said closure member having a plurality of apertures therethrough,
    means for biasing said closure member to the closed position,
    temperature responsive means for moving said closure member to said open position against the force of said biasing means, and
    fusible means in said apertures adapted to melt at different predetermined temperatures to closely control the temperature of the cooling liquid and to allow flow of cooling liquid past said closure member when it is in a closed position.

2. The thermostat of claim 1 wherein said fusible means is a chemical formula.

3. The thermostat of claim 2 wherein said chemical formula is In, Bi, Sn, and/or other chemical formula.

4. The thermostat of claim 2 wherein said fusible means comprises a compressed chemical formula within the closure member aperture.

5. A thermostat for a liquid cooling system, comprising:
    a seat member having a flow opening therethrough,
    a closure member movable between an open position spaced from said seat member and a closed position in engagement with said seat member wherein it closes said flow opening,
    means for biasing said closure member to the closed position,
    temperature responsive means for moving said closure member to said open position against the force of said biasing means, and
    said seat member having a plurality of apertures therethrough and fusible means in said apertures adapted to melt at different predetermined temperatures to closely control the temperature of the cooling liquid and to allow flow of cooling liquid past said seat member when said closure member is in a closed position.

* * * * *